United States Patent
Pepper

(10) Patent No.: US 7,496,688 B2
(45) Date of Patent: Feb. 24, 2009

(54) LABEL SWITCHED DATA UNIT CONTENT EVALUATION

(75) Inventor: Gerald Pepper, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 863 days.

(21) Appl. No.: 10/768,824

(22) Filed: Jan. 30, 2004

(65) Prior Publication Data

US 2005/0169277 A1 Aug. 4, 2005

(51) Int. Cl.
- G06F 15/16 (2006.01)
- G06F 15/173 (2006.01)
- G06F 15/177 (2006.01)

(52) U.S. Cl. ............... 709/249; 370/236; 370/292; 709/238

(58) Field of Classification Search ......... 709/245–255, 709/217–228; 370/236, 292

See application file for complete search history.

(56) References Cited

U.S. PATENT DOCUMENTS

| | | | |
|---|---|---|---|
| 5,787,253 | A | 7/1998 | McCreery et al. |
| 6,172,989 | B1 | 1/2001 | Yanagihara et al. |
| 6,233,256 | B1 | 5/2001 | Dieterich et al. |
| 6,252,891 | B1 | 6/2001 | Perches |
| 6,321,264 | B1 | 11/2001 | Fletcher |
| 6,339,595 | B1 * | 1/2002 | Rekhter et al. ............ 370/392 |
| 6,580,707 | B1 | 6/2003 | Ikeda |
| 6,721,274 | B2 | 4/2004 | Hale |
| 7,023,846 | B1 * | 4/2006 | Andersson et al. ......... 370/389 |
| 2001/0039590 | A1 | 11/2001 | Furukawa |
| 2003/0043434 | A1 | 3/2003 | Brachmann et al. |
| 2004/0010612 | A1 | 1/2004 | Pandya |
| 2004/0030757 | A1 | 2/2004 | Pandya |
| 2004/0052257 | A1 * | 3/2004 | Abdo et al. ............... 370/392 |
| 2004/0151180 | A1 * | 8/2004 | Hu et al. .................. 370/392 |
| 2004/0184408 | A1 * | 9/2004 | Liu et al. .................. 370/236 |
| 2004/0258073 | A1 * | 12/2004 | Alexander et al. ........ 370/395.5 |
| 2005/0160180 | A1 * | 7/2005 | Rabje et al. .............. 709/238 |

FOREIGN PATENT DOCUMENTS

EP 0895375 2/1999

OTHER PUBLICATIONS

Spirent Communications, MPLS Virtual Private Networks, White Paper, Spirent Communications, Mar. 2004; see pp. 2-18.
Semeria, C., Multiprotocol Label Switching: Enhancing Routing in the New Public Network, White Paper, Juniper Networks, Sep. 27, 1999; see pp. 3-18.
Trillium, Multiprotocol Label Switching (MPLS), The International Engineering Consortium, Web ProForum Tutorials, http://www.iec.org, Jun. 9, 2000; see pp. 3-16.
Rosen, E., et al, Multiprotocol Label Switching Architecture, Network Working Group Request for Comments: 3031, Jan. 2001; see pp. 2, 9-11.
Rosen, E. et al., MPLS Label Stack Encoding, Network Working Group Request for Comments: 3032, Jan. 2001; see pp. 2-17.

* cited by examiner

*Primary Examiner*—Haresh N Patel
(74) *Attorney, Agent, or Firm*—SoCal IP Law Group LLP; Steven C. Sereboff; Mark Andrew Goldstein

(57) ABSTRACT

Evaluation of label switched data units is disclosed. In a method, a data unit is received or obtained, and, when the data unit is a label switched data unit, a kind of an encapsulated data unit included in a message body of the data unit is determined by analyzing the message body. The method may be achieved as part of a network interface included on a board in a network testing unit and in a computing device.

20 Claims, 4 Drawing Sheets

LABEL SWITCHED DATA UNIT CONTENT EVALUATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field Of The Invention

The present invention relates to data communications and network traffic analysis.

2. Description Of Related Art

Networks such as the Internet carry a variety of data communicated using a variety of network devices including servers, routers, hubs, switches, and other devices. Before placing a network into use, the network, including the network devices and network applications included therein, may be tested to ensure successful operation. Network devices may be tested, for example, to ensure that they function as intended, comply with supported protocols, and can withstand anticipated traffic demands.

In addition, to assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, analyzing and/or sending network communications.

Label switching is a technique that allows routers to make forwarding decisions based on the contents of a label included in a packet header, rather than by performing a complex route lookup based on a destination IP address included in a packet header. Multi-Protocol Label Switching (MPLS) is a protocol that implements label switching. Label switching also allows for, among other things, and is well suited to, the creation of tunnels through a network. MPLS is defined in Request For Comment (RFC) 3031. To the extent terms in this patent application involve MPLS, definitions and information concerning the terms may be obtained from RFC 3031 and 3032.

DETAILED DESCRIPTION OF THE INVENTION

Throughout this description, the embodiments and examples shown should be considered as exemplars, rather than limitations on the apparatus and methods described.

Description of the System

Figure 1:
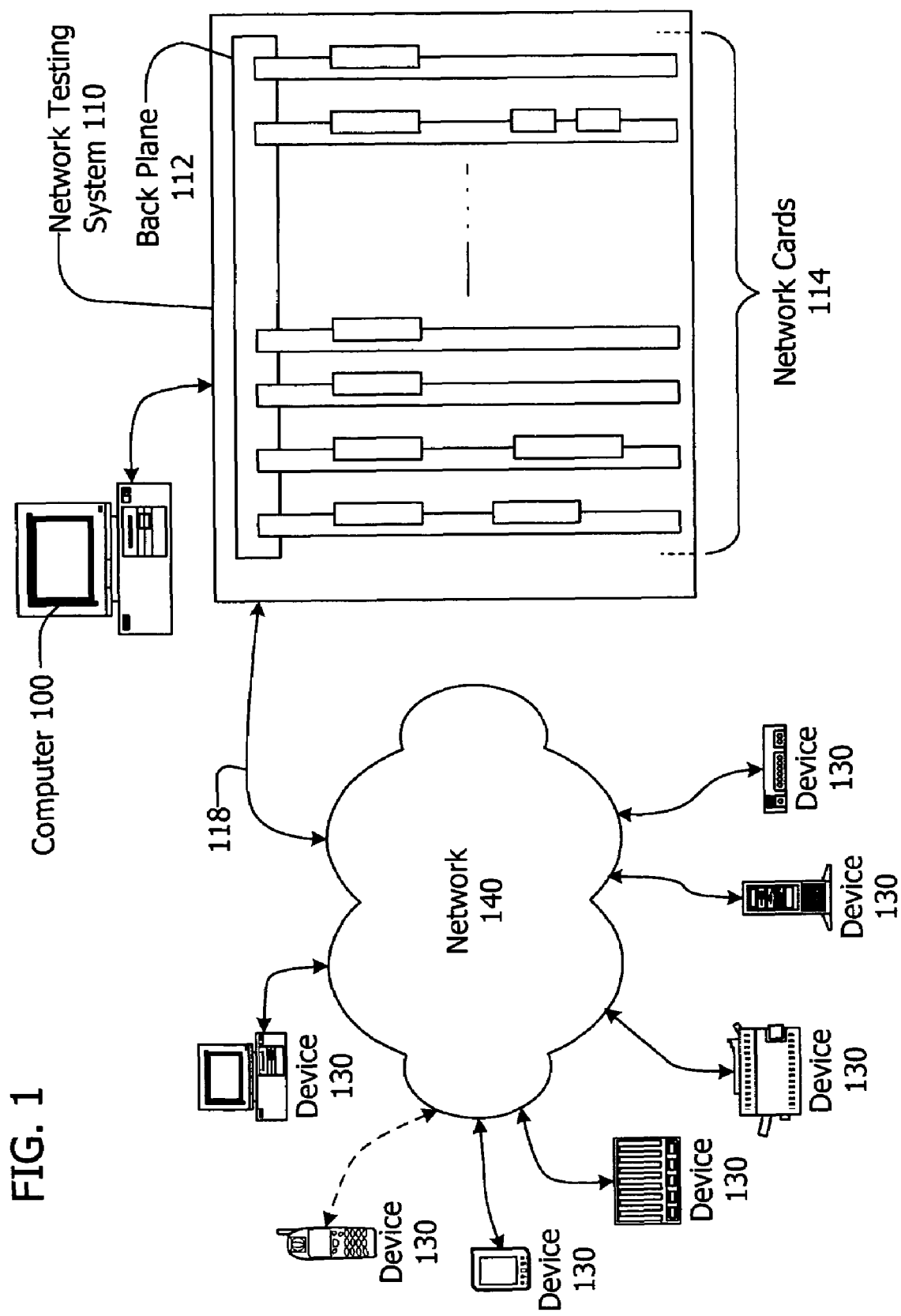
FIG. 1 is a block diagram of an environment in which the contents of label switched data units may be evaluated.

FIG. 1 is a block diagram of an environment in which the contents of a label switched data unit may be evaluated. The environment includes network testing system 110 coupled to a network 140. The network testing system 110 may include or be one or more of a performance analyzer, a conformance validation system, a network analyzer, a network management system, and/or others.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 114 and a back plane 112. The chassis of the network testing system 110 and/or one or more of the network cards 114 may be coupled to the network 140 via one or more connections 118. The network cards 114 may be permanently installed in the network testing system 110, may be removable, or may be a combination thereof.

The network testing system 110 and/or one or more of the network cards 114 may include an operating system such as, for example, versions of Linux, Unix and Microsoft Windows.

The network testing system 110 and the network cards 114 may support one or more well known higher level communications standards or protocols such as, for example, one or more versions of the User Datagram Protocol (UDP), Transmission Control Protocol (TCP), Internet Protocol (IP), Internet Control Message Protocol (ICMP), Internet Group Management Protocol (IGMP), Session Initiation Protocol (SIP), Hypertext Transfer Protocol (HTTP), address resolution protocol (ARP), reverse address resolution protocol (RARP), file transfer protocol (FTP), Simple Mail Transfer Protocol (SMTP); may support one or more well known lower level communications standards or protocols such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI); may support proprietary protocols; and may support other protocols. Each network card 114 may support a single communications protocol, may support a number of related protocols, or may support a number or combination of unrelated protocols.

The term "network card" encompasses line cards, test cards, analysis cards, network line cards, load modules, interface cards, network interface cards, data interface cards, packet engine cards, service cards, smart cards, switch cards, relay access cards, CPU cards, port cards, and others. The network cards may be referred to as blades, particularly when a processor is included on the network card. The network cards 114 may include one or more computer processors, field programmable gate arrays (FPGA), application specific integrated circuits (ASIC), programmable logic devices (PLD), programmable logic arrays (PLA), other processors, other kinds of devices, and combinations of these. The network cards 114 may include memory such as, for example, random access memory (RAM). In addition, the network cards 114 may include software and/or firmware.

At least one network card 114 in the network testing system 110 may include a circuit, chip or chip set that allows for communication over a network as one or more network capable devices. The circuit, chip or chip set that allows for communication over a network may be referred to as a network interface. A network capable device is any device that may communicate over the network 140.

The connections 118 through which network testing system 110 and/or the network cards 114 are coupled with network 140 may be wire lines, optical fiber cables, wireless communication connections, and others, and may be a combination of these. Although only one connection 118 is shown, multiple connections with the network 140 may exist from the network testing system 110 and/or the network cards 114.

The back plane 112 may serve as a bus or communications medium for the network cards 114. The back plane 112 may also provide power to the network cards 114.

The network testing system 110, as well as one or more of the network cards 114, may include software that may execute to achieve the techniques described herein. As used herein, "software" refers to instructions that may be executed on a computer processor. The software may be implemented in a computer language, and may be executed as object code, may be assembly or machine code, a combination of these, and others. "Software" as used herein also refers to FPGA-ware and loadable programmable logic configurations that may be used to program FPGAs and other programmable logic devices. The techniques described herein may be implemented as software in the form of one or more routines, modules, and may include lower level drivers, assembly language, object code, and other lower level software.

The software may be stored on and executed from any local or remote machine readable medium such as, for example, without limitation, magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a machine readable medium. Storage devices include hard disk drives, DVD drives, flash memory devices, and others. When the method is implemented in software, the method may be executed directly from a storage device. The software, object code or other instructions implementing the method may also be transferred from a storage device to an FPGA, EEPROM or other device for execution. A network testing system 110 and/or network cards 114 may be shipped with the method implemented in an FPGA or other device.

The network testing system 110 may have a computer 100 coupled thereto. The computer 100 may be local to or remote from the network testing system 110. The network testing system 110 may include a CPU card that allows the chassis to also serve as a computer workstation. The network testing system 110 may have coupled therewith a display and user input devices such as a keyboard and a mouse, as well as other user input devices including, for example, pens and trackballs. The user input devices may be coupled to a CPU card included in the chassis. The computing device 110 may be used in place of a chassis.

The network testing system 110 may be located physically adjacent to or remote to the devices 130 in the network 140.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these.

Communications on the network 140 may take various forms, including frames, cells, datagrams, packets or other units of information, all of which are referred to herein as data units. A data unit may be comprised of a header and a payload. Those data units that are communicated over a network are referred to herein as network traffic. The network 140 may be comprised of numerous nodes providing numerous physical and logical paths for data units to travel. There may be plural logical communications links between the network testing system 110 and a given network capable device 130.

The network capable devices 130 may be devices capable of communicating over the network 140 and/or listening to network traffic on network 140. The network capable devices 130 may be computing devices such as computer workstations, personal. computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; and networking devices such as routers, relays, firewalls, hubs, switches, bridges, traffic accelerators, and multiplexers. In addition, the network capable devices 130 may include appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

Figure 2:
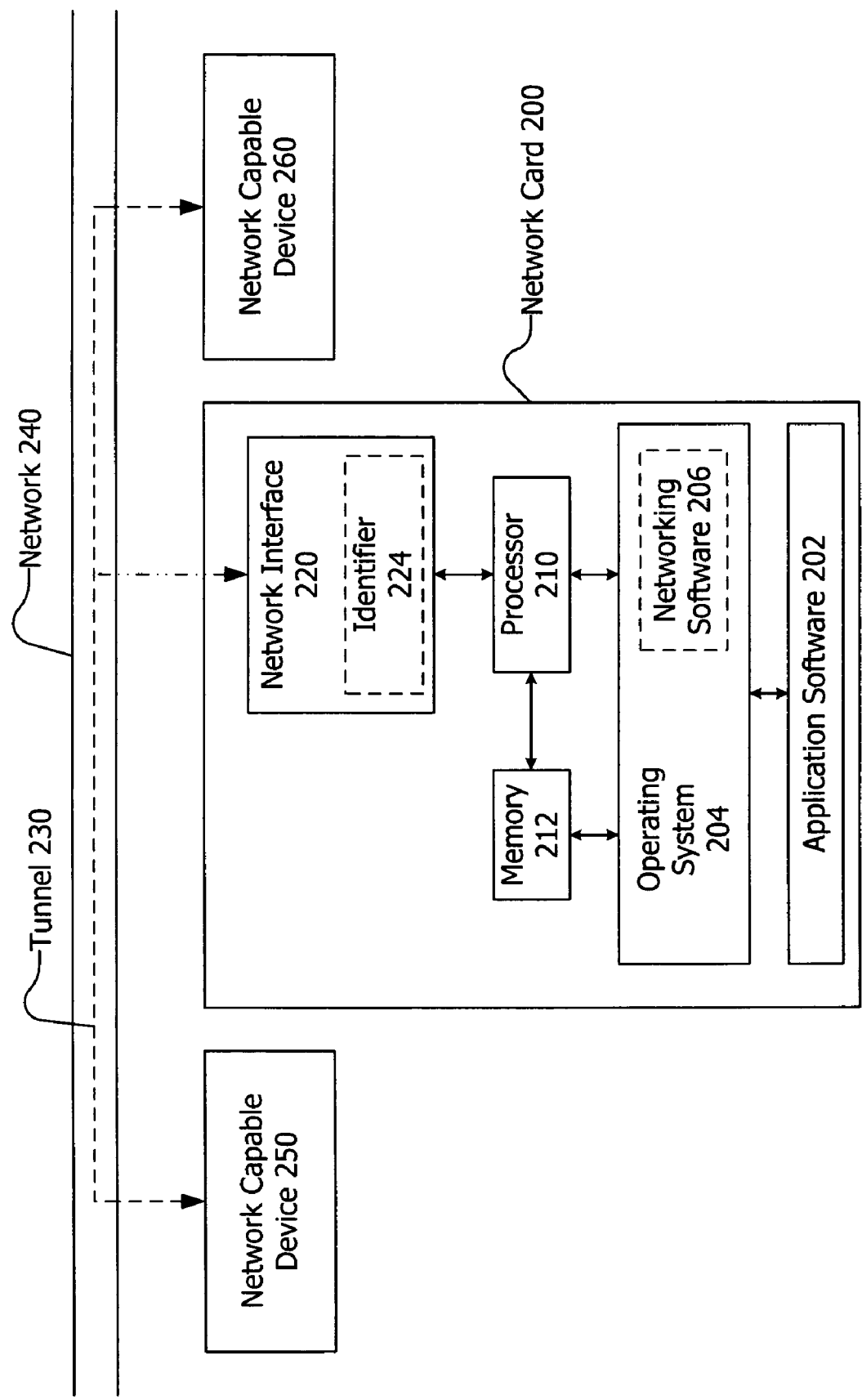
FIG. 2 is a is a block diagram showing a system that includes an apparatus to evaluate the contents of a label switched data unit.

FIG. 2 *a* is a block diagram of an apparatus, namely network card 200, in which the contents of a data unit may be evaluated. The network card 200 may include a network interface 220 through which the network card may communicate over and/or receive communications over network 240. Via the network interface 220, the network card 200 may listen to, capture, or otherwise obtain data units directed between network capable devices 250 and 260 in a tunnel 230 over network 240. The network card 200 may include hardware, software, firmware, and/or a combination thereof.

The network interface 220 may receive network traffic from network 240. The network interface 220 may include logic or instructions that incorporate the methods described herein as identifier 224. The network interface 220 may be implemented as one or more FPGAs. The network interface 220 may also be an ASIC or other device. A processor 210 may be coupled to the network interface 220. A memory unit 212 such as RAM may also be included on network card 200. The network card 200 may have one or more network interfaces, one or more memory units, and one or more processors included thereon.

Memory 212 and/or a hard disk (not shown) or other storage medium coupled with the network card 200 may store data units received over network 240 or pertinent information from data units received over network 240.

The network card 200 may include an operating system 204 as well as networking software 206 that may include data unit labeling software, such as, for example, MPLS software. The memory 212 may be coupled with the processor 210 and the operating system 204.

Application software 202 may be included on or executed on network card 200. The application software 202 may include or be software that allows for network analysis, network traffic analysis, network application analysis, network data capture, network performance analysis, and others. The application software 202 may, in another embodiment, be included on another network card or a CPU card located locally or remotely to the network card 200.

Additional and fewer units, modules or other arrangement of software, hardware and firmware may be used to achieve the methods and devices described herein.

Figure 3:
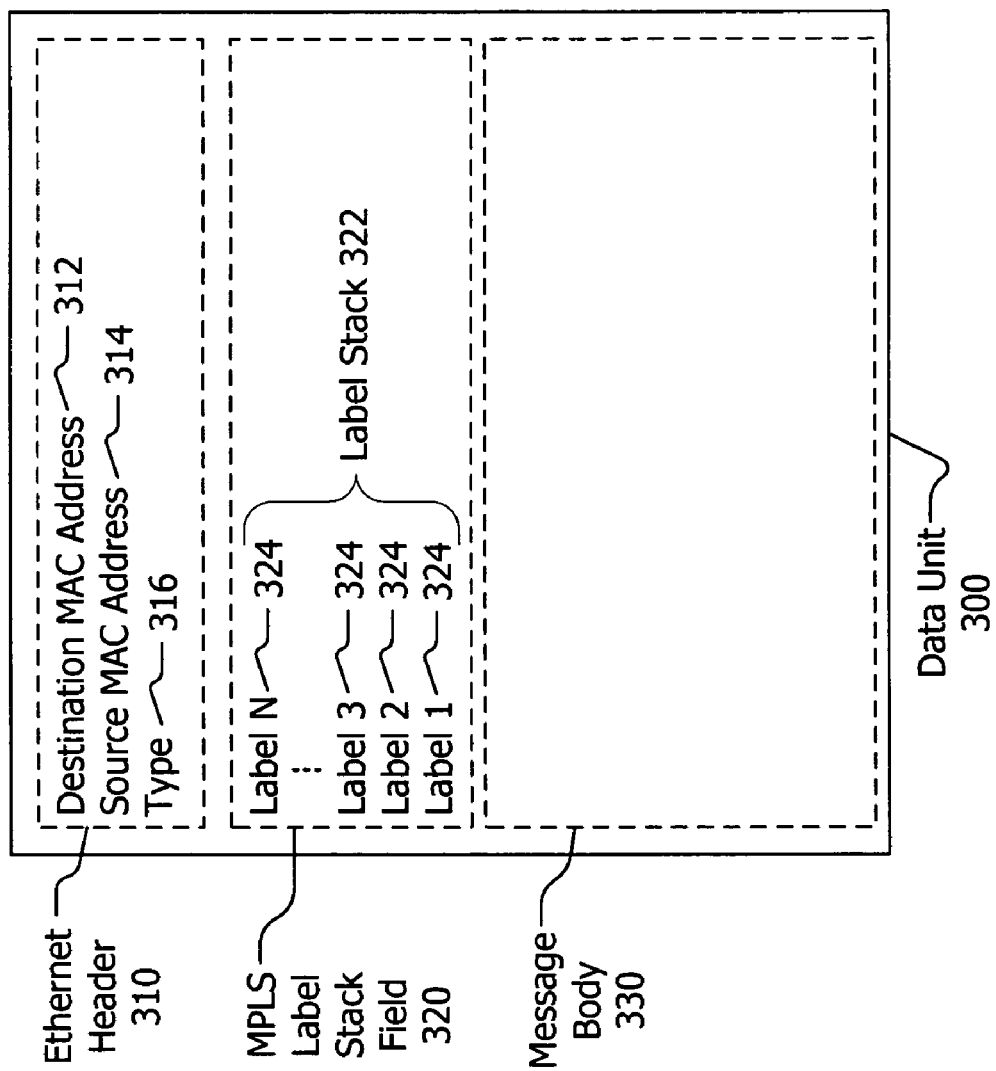
FIG. 3 is a block diagram of the contents of an MPLS data unit.

FIG. 3 illustrates the contents of an example label switched data unit 300. In this example, the label switched data unit 300 is an Ethernet data unit having MPLS data included therein. Such a data unit 300 may contain an Ethernet Header field 310, an MPLS Label Stack field 320, and a message body 330.

The Ethernet Header field 310 may contain a source MAC address 314 and a destination MAC address 312. The source and destination MAC addresses 314 and 312 may be set to the addresses of encapsulating and decapsulating label switching routers (LSRs), respectively. The Ethernet Header field 310 may include a type subfield 316. The type subfield 316 may specify that the data unit 300 includes MPLS data.

The MPLS label stack field 320 may contain an MPLS label stack 322. An MPLS label stack is a last-in, first-out stack of MPLS labels 324. Each MPLS label 324 may be represented by 32 bits, also referred to as four octets. Each MPLS label 324 may include: (1) a 20 bit "label value", the actual value of the label; (2) a 3 bit placeholder for experimental (or future) use; (3) an "S bit", a one bit item signifying whether the label is the bottom of the label stack which may be set to one for the last entry in the label stack (that is, for the bottom of the stack), and zero for all other label stack entries; and (4) an 8 bit time to live value. An MPLS label value may identify a forwarding equivalence class (FEC) to which the packet is assigned. The label stack 322 appears after the data link layer headers, and before any network layer headers or other data which may be included in the message body 330.

The message body 330, which may also be referred to as a payload, may contain one MPLS message body. The MPLS message body 330 may include or be a network layer packet or other data. The message body 330 may immediately follow the label 324 which has the S bit set. The MPLS message body 330 may be an encapsulated message adhering to one of a variety of network communications protocols. For example, the message body may include a message adhering to the one or more versions of the Internet Protocol, such as IP version 4 (IPv4), IP versions 6 (Pv6), and the Internet Packet eXchange protocol (IPx) as well as other higher and lower level communications protocols including, for example, the Sub-Network Access Protocol (SNAP) and Ethernet.

Description of the Methods

Figure 4:
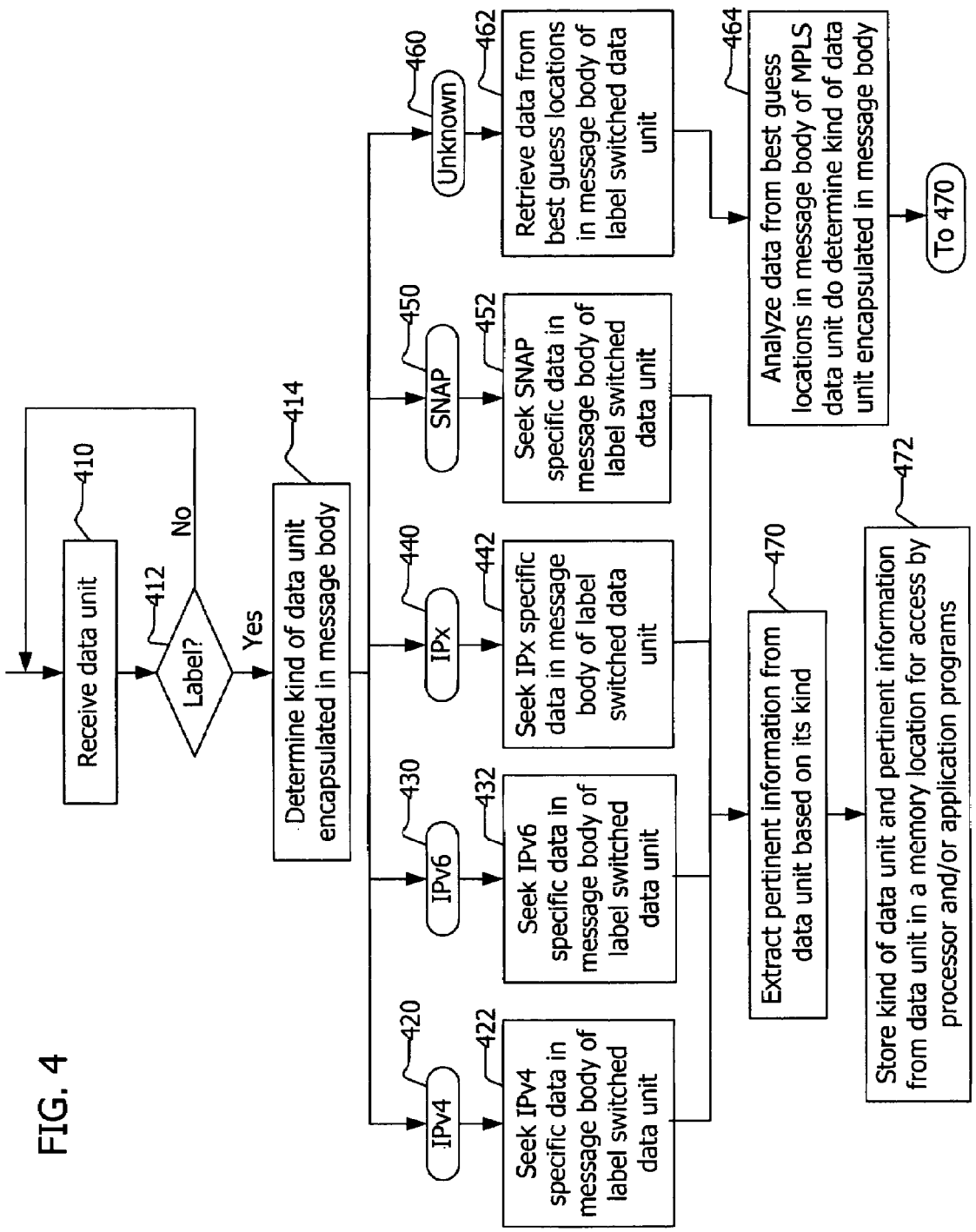
FIG. 4 is a flow chart of a method of evaluating the contents of a label switched data unit.

FIG. 4 is a flow chart depicting a method of evaluating the contents of a label switched data unit. The method may be implemented on an FPGA, may be stored as software on a storage medium such as a hard disk drive and transferred for storage on and execution on an FPGA, may be stored as software and executed by a processor, and may be implemented in a combination of hardware, firmware, and/or software.

Data units may be received, as shown in block 410. The data units may be received in real-time over a network, or may be retrieved from a storage medium such as a hard disk. A check is made to determine whether the data unit is a label switched data unit, as shown in block 412. This check may be made to determine whether the data unit is an MPLS data unit. This check may include examination of a type field in an Ethernet header in the data unit. (See discussion above regarding FIG. 3.) If the data unit is not a label switched data unit, the flow of execution continues at block 410.

If the data unit is a label switched data unit, the message body of the data unit is analyzed to determine the kind of data unit encapsulated in the message body, as shown in block 414. Enough locations or fields in the message body should be checked to keep the classification error rate low or at zero. The determination of the kind of data unit may also be referred to as classification. The message body may include an encapsulated network layer (that is, OSI layer 3) data unit or an encapsulated data unit adhering to another communications protocol.

To determine whether the message body includes a IPv4 data unit 420, IPv4 specific data is sought in the message body of the label switched data unit, as shown in block 422. For example, the first four bits or nibble in the message body may be examined to determine whether the number 4 is present. In addition, the second nibble in the message body may be examined to determine whether the IP header length expected at the location is in the proper range, between 5 and 15 bytes. The checksum of the IP header of an expected IPv4 data unit may be calculated and compared to the data value stored in the data area where a checksum is expected in an IPv4 data unit. A protocol field in an expected location in an IPv4 data unit may be evaluated to determine whether it is within a proper range of expected values. A length of the expected IPv4 data unit may be calculated and compared for accuracy to the data stored in the length field of the expected IPv4 data unit. Other data in other locations may also be sought out to establish or confirm the kind of data unit. For example, unique flags, bits, and other data may also be examined. Enough locations or fields should be checked to keep the classification error rate low or at zero.

To determine whether the message body includes a IPv6 data unit 430, IPv6 specific data is sought in the message body of the label switched data unit, as shown in block 432. The examination of the content of the message body may be similar to that described above regarding block 422 and IPv4. For example, the first four bits or nibble in the message body may be examined to determine whether the number 6 is present. In addition, other data in the message body may be examined and evaluated to determine whether expected data having expected values or in expected ranges are in expected locations in the message body. Data examined may include protocol type, quality of service, and others. In addition, values such as checksums and lengths may be computed and compared to values at expected locations in the message body. Other data in other locations may also be sought out to establish or confirm the kind of data unit.

To determine whether the message body includes an IPx data unit 440, IPx specific data is sought in the message body of the label switched data unit, as shown in block 442. The examination of the content of the message body may be similar to that described above regarding blocks 422 and 432. Data in the message body may be examined and evaluated to determine whether expected data having expected values or in expected ranges are in expected locations in the message body. Data examined may include protocol type, quality of service, and others. In addition, values such as checksums and lengths may be computed and compared to values at expected locations in the message body. Other data in other locations may also be sought out to establish or confirm the kind of data unit.

To determine whether the message body includes a SNAP data unit 450, SNAP specific data is sought in the message body of the label switched data unit, as shown in block 452.

The message body may also be examined to determine whether a raw Ethernet packet is included in the message body. To determine whether the message body includes a raw Ethernet packet, a destination MAC address and a source MAC address may be sought at the expected locations toward the beginning of the message body. In addition, data from where the Ethernet type filed is expected may be evaluated to determine whether it is within an expected range. Other data in other locations may also be sought out to establish or confirm the kind of data unit.

Other network layer, OSI layer 3, data units and other higher and lower level communications protocol data units may be sought. Data in the message body may be examined and evaluated to determine whether expected data having expected values or in expected ranges are in expected locations in the message body based on the particular kind of data unit. In addition, values such as checksums and lengths may be computed and compared to values at expected locations in the message body.

Unknown kinds of data units 460 included in the message body may be sought by retrieving data from best guess location in the message body of the label switched data unit, as shown in block 464. When the message body includes an unknown kind of data unit, data from the best guess locations in the message body of the label switched data unit may be analyzed to determine the kind of data unit encapsulated in the message body, as shown in block 464. The flow of actions continued at block 470.

Various analyses may be performed in parallel to determine the kind of data unit encapsulated in the message body. As such, the actions taken in blocks 422, 432, 442 and 452 and 462 may be executed simultaneously, in parallel. Alternatively, the actions taken in blocks 422, 432, 442 and 452 and 462 may be executed sequentially.

When the message body is determined to include an IPv4 data unit, an IPv6 data unit an Internet Packet eXchange protocol (IPx) data unit, a SNAP data unit, or another known data unit in blocks 422, 432, 442 and 452, pertinent information from the data unit encapsulated in the message body is extracted based on the particular kind of data unit, as shown in block 470. That is, because the kind of data unit is known, according to the specifications defining the particular protocol of the known kind of encapsulated data unit, pertinent information may be retrieved pursuant to the protocol definitions. The pertinent information extracted may include protocol (for example, TCP, UDP, and other higher and lower level communications protocols), source and destination addresses, source and destination ports, quality of service data, application data, and other kinds of data such as pertinent flags, throughput requirements, and others. The pertinent information extracted may be based on the kind of data unit and/or on the protocol found in the data unit. The kind of data unit and the pertinent information extracted from the data unit in the message body of the labeled switched data unit may be stored in a memory location for access by a processor and/or an application program, as shown in block 472.

When label switched data units are received, evaluated and analyzed in real-time according to the method described regarding FIG. 4, an application program may use the stored pertinent information and the kind of data unit to provide real-time analysis of network traffic by analyzing and presenting the information obtained according to the method described in FIG. 4.

With regard to FIG. 4, additional and fewer steps may be taken, and the steps as shown may be combined or further refined to achieve the methods described herein.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

The invention claimed is:

1. A method for determining a kind of an encapsulated data unit included in a message body of a data unit comprising:
   receiving a data unit:
   checking to learn whether the data unit is a Multi-Protocol Label Switched (MPLS) data unit, including examining a type field in a header of the data unit;
   when the data unit is a Multi-Protocol Label Switched (MPLS) data unit, determining a kind of an encapsulated data unit included in a message body of the data unit, including evaluating in parallel whether the encapsulated data unit has Internet Protocol version 4 specific data, Internet Protocol version 6 specific data, an Internet Packet eXchange specific data, Sub-Network Access Protocol specific data, and Ethernet specific data to determine the kind of the encapsulated data unit;
   extracting pertinent information from the encapsulated data unit, the pertinent information based on the kind of the encapsulated data unit; and
   analyzing network traffic based on the kind of encapsulated data unit and the pertinent information.

2. A method for determining a kind of an encapsulated data unit included in a message body of a data unit comprising:
   receiving a data unit intended for another node;
   checking to learn whether the data unit is a label switched data unit;
   when the data unit is a label switched data unit, determining a kind of an encapsulated data unit included in a message body of the data unit, including evaluating in parallel whether the encapsulated data unit has higher level communications protocol specific data and lower level communications protocol specific data included in the encapsulated data unit to determine the kind of the encapsulated data unit;
   extracting pertinent information from the encapsulated data unit, the pertinent information based on the kind of the encapsulated data unit; and
   storing the kind of encapsulated data unit and the pertinent information in a storage medium;
   wherein at least one of the network cards has further instructions stored thereon which cause the network testing system to perform further operations comprising:
   analyzing network traffic based on the kind of encapsulated data unit and the pertinent information.

3. A network testing system comprising a plurality of network cards, at least one network card of the plurality of network cards including:
   a processor;
   a memory coupled with the processor;
   a storage device having instructions stored thereon which when executed cause the network testing system to perform actions comprising:
   receiving a data unit;
   checking to learn whether the data unit is a label switched data unit, including examining a type field in a header of the data unit;
   when the data unit is a label switched data unit, determining a kind of an encapsulated data unit included in a message body of the data unit, the determining including performing a plurality of analyses of the message body in parallel;

extracting information from the encapsulated data unit based on the kind of the encapsulated data unit;

storing the kind of encapsulated data unit and the pertinent information in a storage medium.

4. The network testing system of claim 3 wherein the data unit is intended for a node that is not performing the receiving.

5. The network testing system of claim 3 wherein the plurality of analyses comprises:

evaluating whether the encapsulated data unit has one of an Internet Protocol specific data, Sub-Network Access Protocol specific data, and Ethernet specific data to determine the kind of the encapsulated data unit.

6. The network testing system of claim 5 wherein the Internet Protocol (IP) specific data conforms to at least one of an IP version 4, an IP version 6, and an Internet Packet eXchange protocol.

7. The network testing system of claim 3, wherein the analyzing network traffic is performed by an application program.

8. A computing device to evaluate network traffic, the computing device comprising:

a processor;

a memory coupled with the processor;

a storage device having instructions stored thereon which when executed cause the computing device to perform actions comprising receiving a data unit;

checking whether the data unit is a label switched data unit, including examining a type field in a header of the data unit;

when the data unit is a label switched data unit, determining a kind of an encapsulated data unit included in a message body of the data unit, the determining including performing a plurality of analyses of the message body in parallel;

extracting information from the encapsulated data unit based on the kind of the encapsulated data unit; and storing the kind of encapsulated data unit and the pertinent information in a storage medium;

wherein the computer device having further instructions which cause the computing device to perform further operations comprising:

analyzing network traffic based on the kind of encapsulated data unit and the pertinent information.

9. The computing device of claim 8 wherein the data unit is intended for a node that is not performing the receiving.

10. The computing device of claim 8 wherein the plurality of analyses comprises:

evaluating whether the encapsulated data unit has one of an Internet Protocol specific data, Sub-Network Access Protocol specific data, and Ethernet specific data to determine the kind of the encapsulated data unit.

11. The computing device of claim 10 wherein the Internet Protocol (IP) specific data conforms to at least one of an IP version 4, an IP version 6, and an Internet Packet eXchange protocol.

12. The computing device of claim 8, wherein the analyzing network traffic is performed by an application program.

13. A method for determining a kind of an encapsulated data unit included in a data unit comprising:

receiving a data unit;

checking whether the data unit is a label switched data unit, including examining a type field in a header of the data unit;

when the data unit is a label switched data unit, determining a kind of an encapsulated data unit included in a message body of the data unit, the determining including performing a plurality of analyses of the message body in parallel;

extracting pertinent information from the encapsulated data unit based on the kind of the encapsulated data unit;

storing the kind of encapsulated data unit and the pertinent information in a storage medium; and analyzing network traffic based on the kind of encapsulated data unit and the pertinent information.

14. The method of claim 13 wherein the data unit is intended for a node that is not performing the receiving.

15. The method of claim 13 wherein the plurality of analyses comprises:

evaluating whether the encapsulated data unit has one of an Internet Protocol specific data, Sub-Network Access Protocol specific data, and Ethernet specific data to determine the kind of the encapsulated data unit.

16. The method of claim 15 wherein the Internet Protocol specific data conforms to at least one of Internet Protocol version 4, Internet Protocol version 6, and Internet Packet eXchange protocol.

17. The method of claim 13, wherein the analyzing network traffic is performed by an application program.

18. A method for determining a kind of an encapsulated data unit included in a data unit comprising:

receiving a data unit;

checking whether the data unit is a label switched data unit, including examining a type field in a header of the data unit;

when the data unit is a Multi-Protocol Label Switched (MPLS) data unit, determining a kind of an encapsulated data unit included in a message body of the data unit, including performing a plurality of analyses of the message body in parallel;

extracting pertinent information from the encapsulated data unit based on the kind of the encapsulated data unit;

storing the kind of encapsulated data unit and the pertinent information in a storage medium; and analyzing network traffic based on the kind of encapsulated data unit and the pertinent information.

19. The method of claim 18 wherein the plurality of analyses comprises:

evaluating whether the encapsulated data unit has one of Internet Protocol version 4 specific data, Internet Protocol version 6 specific data, Internet Packet eXchange specific data, Sub-Network Access Protocol specific data, Ethernet Specific data, and unknown specific data to determine the kind of the encapsulated data unit.

20. The method of claim 18, wherein the analyzing network traffic is performed by an application program.

* * * * *

UNITED STATES PATENT AND TRADEMARK OFFICE
CERTIFICATE OF CORRECTION

PATENT NO. : 7,496,688 B2  Page 1 of 1
APPLICATION NO. : 10/768824
DATED : February 24, 2009
INVENTOR(S) : Gerald Pepper It is certified that error appears in the above-identified patent and that said Letters Patent is hereby corrected as shown below:

Column 8, line 23: replace "and" with "storing the kind of encapsulated data unit and the pertinent information in a storage medium; and"

Column 8, line 43: add "and"

Column 8, line 44: delete "wherein at least one of the network cards has further instructions stored therein which cause the network testing system to perform further operations comprising:"

Column 9, line 4: replace "." with "; and analyzing network traffic based on the kind of encapsulated data unit and the pertinent information."

Column 9, line 38: add "and"

Column 9, line 39: delete ""wherein at least one of the network cards has further instructions stored therein which cause the network testing system to perform further operations comprising:"

Signed and Sealed this

Twelfth Day of May, 2009

JOHN DOLL
*Acting Director of the United States Patent and Trademark Office*